United States Patent [19]

Liedtke et al.

[11] 4,309,646
[45] Jan. 5, 1982

[54] CONTROL ARRANGEMENT FOR WINDSHIELD WIPER APPARATUS

[75] Inventors: Karl-Heinz Liedtke, Lauffen; Horst Rachner, Bietigheim-Bissingen, both of Fed. Rep. of Germany

[73] Assignee: ITT Industries, Inc., New York, N.Y.

[21] Appl. No.: 141,465

[22] Filed: Apr. 18, 1980

[30] Foreign Application Priority Data

Apr. 28, 1979 [DE] Fed. Rep. of Germany ....... 2917324

[51] Int. Cl.³ .............................................. H02P 1/04
[52] U.S. Cl. ..................................... 318/443; 318/444
[58] Field of Search ............................. 318/443, 444; 15/250.16, 250.17, 250.13

[56] References Cited

U.S. PATENT DOCUMENTS

| | | | |
|---|---|---|---|
| 2,934,965 | 5/1960 | Perry | 15/250.17 X |
| 3,037,391 | 6/1962 | Bell et al. | 15/250.17 X |
| 3,112,510 | 12/1963 | Forbush et al. | 15/250.17 X |
| 3,115,598 | 12/1963 | Ziegler | 15/250.17 X |
| 3,689,817 | 9/1972 | Elliott | 318/443 |
| 3,927,436 | 12/1975 | Inoue et al. | 318/443 X |

*Primary Examiner*—Ulysses Weldon
*Attorney, Agent, or Firm*—James B. Raden; Donald J. Lenkszus

[57] ABSTRACT

In a windshield wiper system of the type using a reversible electric motor, and controlled by a reversing switch, at least one of the reversing points is variable in dependence on the switching position of an operating switch. The range of angular rotation of the motor armature is thereby increased when the operating switch is moved to the "off" position to in turn assure that the wiper blades will be moved to a concealed parking position.

3 Claims, 5 Drawing Figures

CONTROL ARRANGEMENT FOR WINDSHIELD WIPER APPARATUS

FIELD OF THE INVENTION

This invention relates to windshield wiper apparatus, in general, and to a circuit arrangement for a reversible electric windshield wiper motor, in particular.

BACKGROUND OF THE INVENTION

Windshield wiper installations for motor vehicles are known in which a motor which rotates in one direction drives a pendulum gear. Windshield wiper installations are also known wherein a reversible motor is used which is controlled via a reversing switch. The reversing switches are generally changed over by a motor-driven switching cam. The wipers, directly driven by this pendulum-type motor move between two reversing positions of which one is the parking position.

Wiper installations are known in which, during normal wiper operation, the wipers move between two reversing positions, and in which the wipers may be displaced into a depress parking position in which they are no longer in front of the windshield. In known wiper installations of this kind utilizing a non-reversing motor the effective crank radius of the crank gear is varied for entering the wipers into the so-called concealed parking position. The construction of such wiper installations is very complicated and susceptible to trouble.

A wiper arrangement is known in which the angle of the pendulum-type motor can be varied. In this arrangement, however, only an adaptation of the wiping angle to a given size of the windscreen has been considered. No provision is made for varying the angle of rotation in dependence on the switching position of the operating switch.

The invention is directed to the problem of creating a wiper installation, the wiper blade of which can be moved to a concealed parking position, without complicated catches and cranks.

SUMMARY OF THE INVENTION

This and other problems are solved in accordance with the principles of the invention with a circuit arrangement for a reversible electric motor in which at least one of the two switching points of the reversing switch is variable in dependence on the switching position of the operating switch.

In accordance with the principles of the invention, the angle of rotation of the pendulum-type motor is enlarged when the operating switch is switched off. Thereby it is ensured in a simple manner that when the wiper installation is switched off, the wipers are moved out of the normal wiping area into the concealed parking position. This basic idea can be realized by a pendulum-type gearing in a much simpler way than in known wiper installations, whereby electric or electronic components are preferably used, so that the mechanical parts susceptible to trouble can be saved.

The above described principle of the invention, i.e., varying the angle of rotation of the electric motor in dependence on the switching position of the operating switch, can also be advantageously used if the actual wiping area is to be varied. For instance in so-called one-lever wiper installations for rear windows of motor vehicles, the wiping area may be reduced by putting the switching points of the reversing switch nearer to each other, when it is heavily raining. For this reduced wiping area, the effect obtained is the same as if the rotational speed of the motor had been increased. The number of wiping cycles per time unit is thereby increased, which is very advantageous during heavy rain. In such a version both switching points of the reversing switch will be varied in dependence on the switching position of the operating switch.

BRIEF DESCRIPTION OF THE DRAWING

The invention may be better understood from a reading of the following detailed description in conjunction with the drawing in which.

DETAILED DESCRIPTION

Figures 1, 1A:
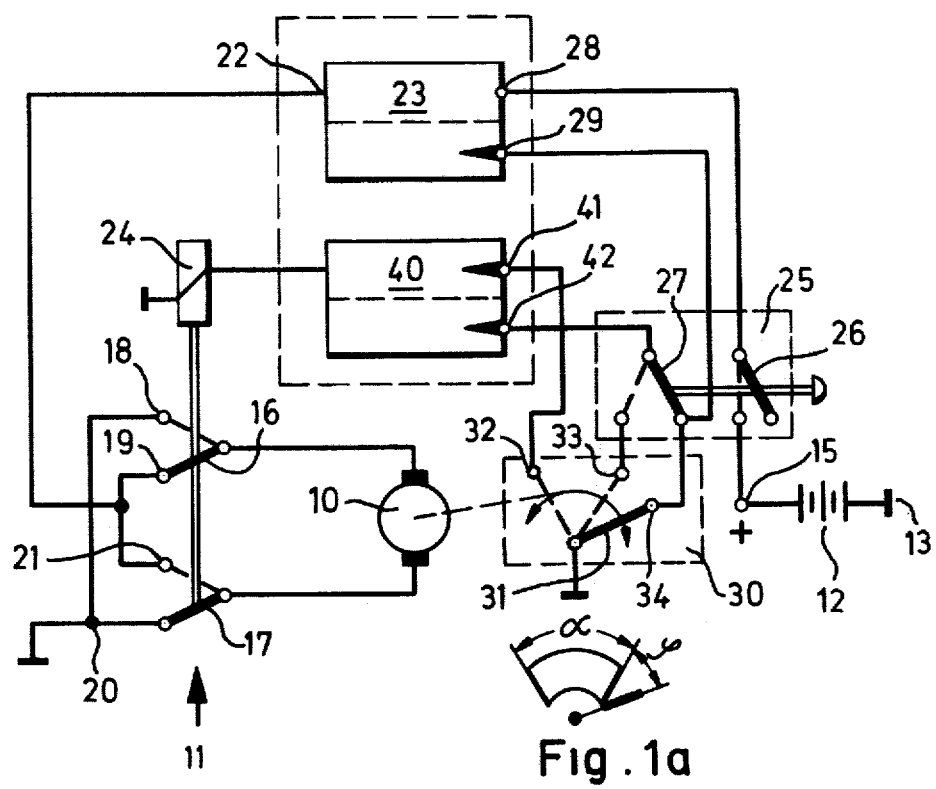
FIG. 1 illustrates, in schematic form, a first windshield wiper arrangement with several position switches.
FIG. 1a illustrates the range of angular rotation of a motor armature.

In FIG. 1 the electric motor is designated by 10. The motor 10 is connectable to a voltage source 12 via a reversing switch 11. The electric motor 10 is directly connected to the two movable briding contacts 16 and 17 of the reversing switch. The stationary contacts 18 and 20 are interconnected and applied to earth 13. The two other stationary contacts 19 and 21 are also interconnected and connected to the output 22 of the one main store 23. The movable bridging contacts 16 and 17 are together connected via a relay 24. The operating switch 25 has a make contact 26 and a changeover contact 27 which are actuated together.

A position switch designated generally by 30, which may be a switch wafer, is actuated by the electric motor 10. A contact segment 31, which is permanently grounded, cooperates with the stationary contacts 32, 33 and 34. In the switch position shown the contact segment 31 ground potential is applied to the stationary contact 34. This is the position of the contact segment 31 in the concealed parking position. If the electric motor 10 rotates the contact element 31 is finally switched on the stationary contact 33 after an angle of rotation $\psi$. This position of the contact segment 31 characterizes the one reversing position during normal wiper operation. The other reversing positon is reached, when the contact segment 31 rests on the stationary contact 32.

FIG. 1a shows that during normal wiper operation the wiper moves between first and second reversing positions and thereby traverses the angle $\alpha$. When the wiper is switched off, the wiper will be rotated by the angle $\psi$ in clockwise direction from the second reversing position and to the concealed parking position. If the operating switch 25 is actuated, positive potential is conducted to the set input of the main store 23 via the make contact 26. Then positive potential appears at the output 22 of main store 23 and is applied to the electric motor 10 via the changeover bridging contacts 16 and 17 respectively causing the motor 10 to rotate in a particular direction.

The changeover contact 27 was changed over to establish a connection between stationary contact 33 of the position switch and a reset input 42 of a reversing store 40, thereby applying a first switching signal to reset input 42.

The contact segment 31 now rotates in a counterclockwise direction by the rotating motor 10. When contact segment 31 rests on the stationary contact 33, a second switching signal is generated at the reset input 42. This signal, however, does not affect the switching condition of the reversing store 40, because it was in a reset condition. As soon as the contact segment 31 touches the stationary contact 32 a third switching signal is conducted to a set input 41 of the reversing store 40, resulting in the reversing store 40 being set. With store 40 in the set condition the relay 24 operates and the bridging contacts 16 and 17 are changed over to contacts 18 and 21, respectively. Thus the voltage conducted to the electric motor 10 is reversed and the motor rotates in the opposite direction. If now the contact segment 31 again touches the stationary contact 33 the store 40 is reset and the relay 24 is de-energized. The direction of rotation of the electric motor is thereby changed anew. This process is continuously repeated as long as the operating switch remains switched on. Within the wiping area predetermined by the angle α the wipers periodically move from one reversing position to the other, whereby the switching signals are generated, when the contact segment 31 touches the stationary contact 32 and 33 respectively, through which the reversing store 40 is set and reset respectively.

It should be noted that stores 23 and 40 may each compose a flip-flop of a type known in the art. If the wiper installation is now switched off and thus the changeover contact 27 and the make contact 26 are again brought into the position shown in FIG. 1 at first the switching condition of the stores 23 and 42 respectively remains unchanged. Thus the store 23 remains set, so that the electric motor continues to rotate in the direction of rotation it has at the moment. When the contact segment 31 touches the stationary contact 34 the first switching signal is generated at the reset input 42 of the reversing store 40 via the changeover contact 27. With store 40 reset, the relay 24 becomes de-energized. At the same time the main store 23 is reset too, for this third switching signal is also conducted to the reset input 29. The wiper motor is switched off and the wipers are in the concealed parking position.

Thus in the embodiment of FIG. 1 the switching point of the reversing switch 11 is varied with changing over of the operating switch. With the operating switch switched on the reversing switch switches when the contact segment rests on the stationary contact 33. When the operating switch is switched off, the relay 24 is only de-energized, when the contact segment 31 touches the stationary contact 34 which is staggered by an angle of rotation 4. A third position switch which is realized by cooperation of the contact segment 31 with the stationary contact 32, releases the third switching signal in the invariable reversing position.

It is possible to also vary the other switching point of the reversing switch in dependence on the operating switch. For instance between the set input 41 and the stationary contact 32 and an additional stationary contact a further changeover contact can be provided.

In this manner it is possible to vary for instance the wiping angle α with a third switching position of the operating switch 25.

Figure 2:
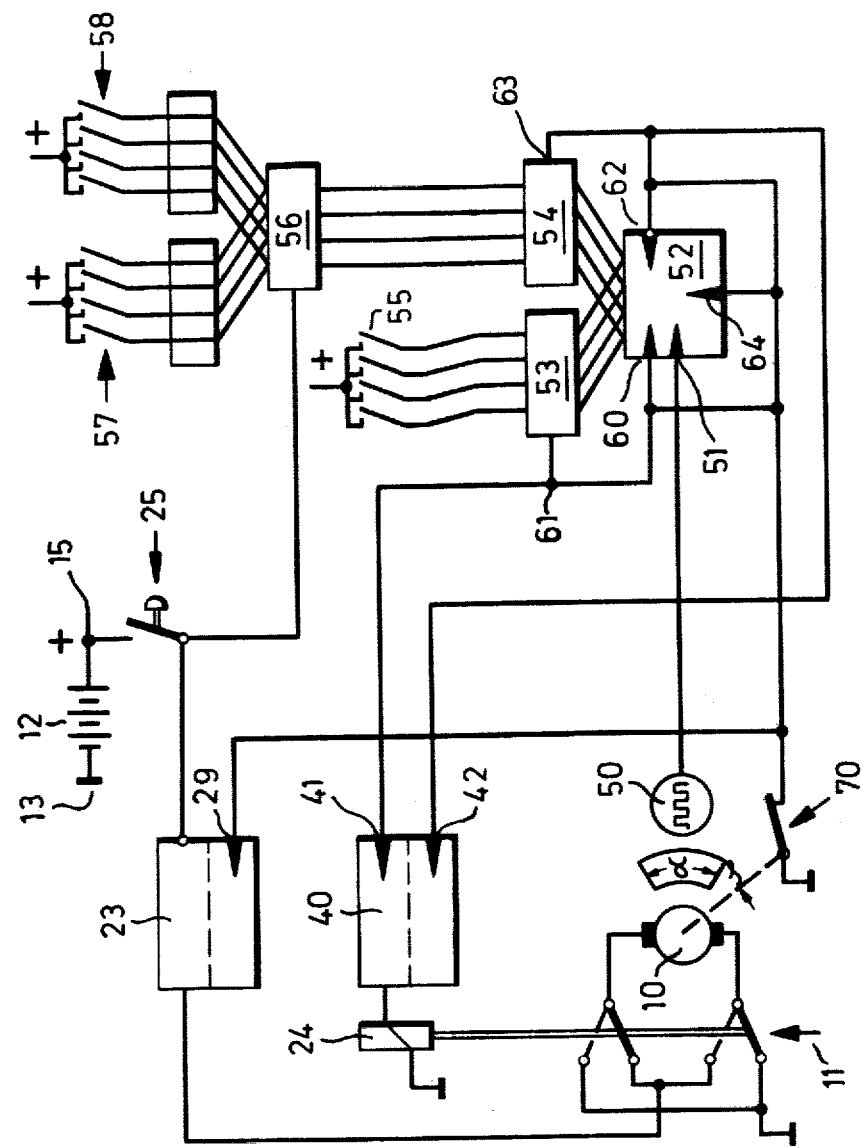
FIG. 2 illustrates a second windshield wiper arrangement with a pulse generator for the purpose of determining the angle of rotation.

In a second embodiment according to FIG. 2 a main store 23 and a reversing store 40 are also provided. Certain components correspond to those of FIG. 1, so that a detailed description is not necessary. In FIG. 2 a pulse generator 50 is assigned to the electric motor 10 instead of different position switches. The pulses of pulse generator 50 are conducted to the clock input 51 of a reversible counter 52. The outputs of counter 52 are conducted to two comparator stages 53 and 54. At the other input of the comparator stage 53 a number to be determined by the switches 55 is available in a digital form. The other input of the comparator stage 54 is connected to the output of a changeover switch 56. On the inputs of changeover switch 56 different numerical values can be switched via the switches 57 and 58 respectively. The forward-backward counter 52 has a dynamical counting direction input 60 which is connected to the output of the comparator stage 53. If the numerical values conducted from the counter 52 and the switches 55 to said comparator stage 53 are the same, the potential at the output of this comparator stage changes and the counting direction of the counter 52 is reversed. The counter 52 has a further counting direction input 62 which is controlled through the output 63 of the comparator stage 53. The output signals of the comparator signals 53 and 54 respectively are conducted to the set input 41 or reset input 42 of the reversing store. Finally the changeover switch 56 is controlled through the operating switch in such a way that in the shown switching condition of the operating switch the numerical value selected by the switches 57 is transmitted to the comparator stage 54.

The circuit arrangement according to FIG. 2 operates as follows: When the operating switch 25 is actuated the main store 23 is set as previously described and voltage is applied to the motor 10. The motor rotates in a particular direction of rotation. Via the pulse generator 50 pulses are generated which are counted by the forward-backward counter 52. It is assumed that said counter was reset and the pulses are counted in forward direction first. As soon as the output of counter 52 has a numerical value which corresponds to that adjusted by the switches 55, the comparator stage 53 releases a switching signal which controls the counting direction input 60. Now the counter counts backward until the numerical value available at its output equals that which is conducted to the other comparator stage 54. Because the operating switch 25 is switched on this is the numerical value determined by the switches 57. This numerical value is greater than that which may be determined by the switches 58. By way of example for better understanding it is assumed that the number 100 is selected via the switches 57 and the number 0 via the switches 58. Thus during normal wiper operation the counter 52 is continuously counting forward and backward between the numbers 10 and 100. If these limits are reached the direction of rotation of the motor is reversed, because the output signals of the comparator stages 53 and 54 are conducted to the set or reset input of the reversing store 40.

If the operating switch is switched off now the direction of rotation of the motor is not changed at first. However the changeover switch 56 is changed over, so that now instead of the number 10 the number 0 predetermined by the switches 58 is conducted to the comparator stage 54. Now a signal is only generated when the counter 52 has counted backward to 0. For this more pulses are necessary, so that the wipers are brought into the concealed parking position. Because the outputsignal of the comparator stage 54 is conducted to the reset input 29 of the main store 23 the wiper installation is switched off. In this connection it is pointed out that the set input has precedence of the reset input. Thus said main store 23 cannot be reset as long as the operating switch is switched on.

The circuit arrangement is able to function with the components described. Difficulties may occur, if during wiper operation, for instance, the voltage source 12 is disconnected and the wipers are in a position within the wiping area. Specifically, the counter 52 may be reset by switching off of the supply voltage. It is therefore necessary that a position switch 70 is assigned to the motor which sets the forward-backward counter to a predetermined number depending on the position of the wipers. In an embodiment of the invention the counter 52 is reset, when the wipers are at the concealed parking position. It is, however, possible to set the counter on a particular value in the reversing position, e.g. the value 100.

Thus, one of the two switching points is varied in dependence on the switching position of the operating switch. This is achieved in that different numerical values are conducted to the comparator stage 54 via the changeover switch 56. These numerical values serve as reference numerals which are compared to the counter output.

In the embodiment according to FIG. 2, by adjusting the switches 57, 58 and 55 respectively any wiping angle and any angle $\psi$ can be predetermined. Such a wiper installation can therefore be easily adapted to different conditions. The other reversing point may also be changed in dependence on the switching position of the operating switch. For this purpose further changeover switches may be provided which can also conduct different numerical values to the comparator stage 53.

Figure 4:
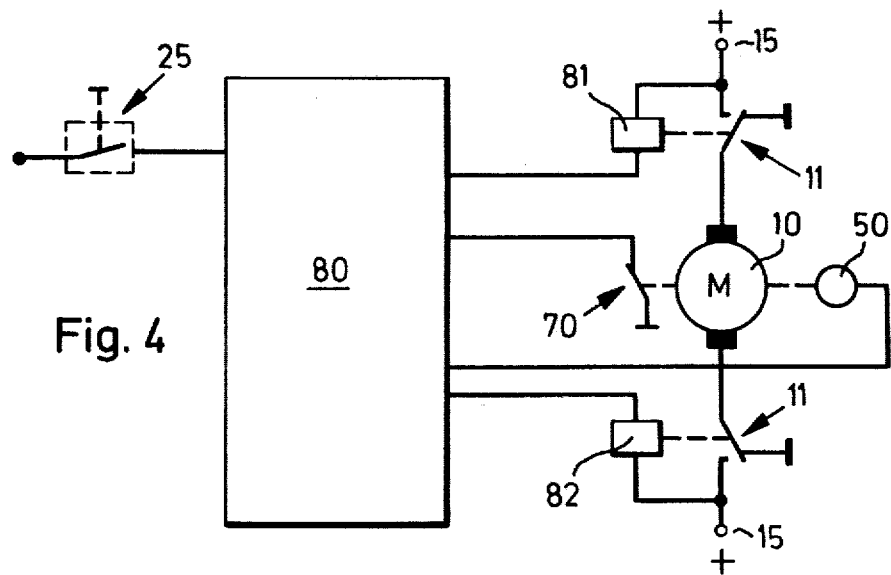
FIG. 4 illustrates in schematic form an evaluation circuit for use in the arrangement of FIG. 2.
Figure 3:
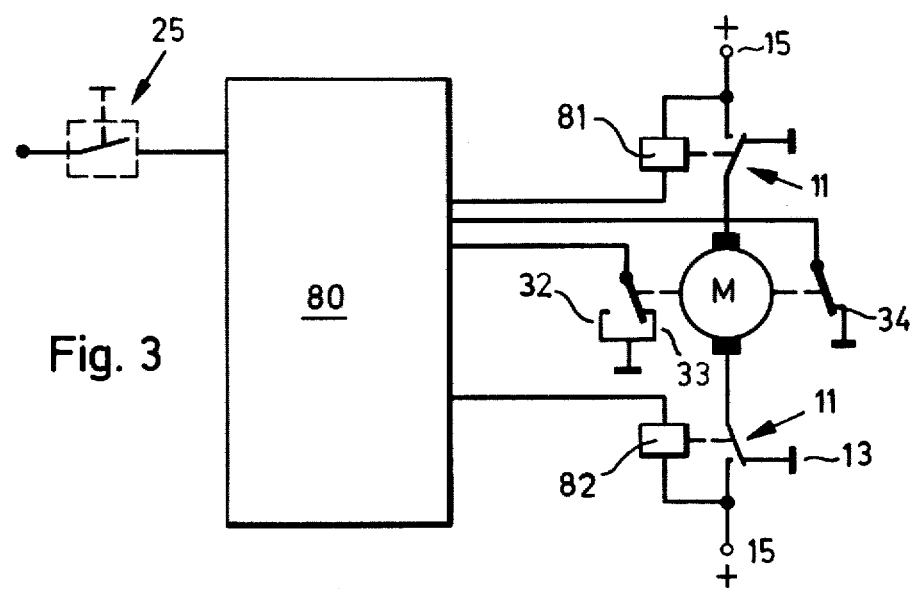
FIG. 3 illustrates in schematic form an evaluation circuit comprising a micro-computer for use in the arrangement of FIG. 1.

FIGS. 3 and 4 illustrate that the control arrangements of FIGS. 1 and 2, respectively can advantageously be realized by using a micro-computer 80. To this micro-computer the switching signals of the positions switches and of the operating switch are conducted. These switching signals affect the program flow in the micro-computer in such a way that the micro-computer output provides the switching signal for the reversing switch.

Thereby FIG. 3 substantially corresponds to the version according to FIG. 1, whereas FIG. 4 is based on the version according to FIG. 2.

In the mode of operation the versions assigned to each other do not differ, but the reversing switch will be advantageously realized by two relays 81 and 82. This has the advantage that before the direction of rotation of the motor is reversed, thus before reversing of poles, the motor is at first short-circuited and dynamically braked by the relays being sequentially controlled one after the other. This idea and advantageous further developments are described in copending U.S. patent applications Ser. No. 97,848 filed Nov. 27, 1979 and Ser. No. 97,914 filed Nov. 28, 1979, now U.S. Pat. No. 4,271,381. It is explicitly referred to these patent applications herewith, so that further detailed descriptions are not necessary.

What is claimed is:
1. Windshield wiper apparatus comprising:
a voltage source;
a reversible wiper motor means adapted to drive a drive shaft means for oscillating a windshield wiper;
reversing switch means for coupling said motor to said voltage source, said switch means having first and second conductive states and being responsive to first and second control signals for switching between said first and second conductive states, said reversing switch means in said first conductive state coupling said motor to said voltage source such that said drive shaft means rotates in a first direction, said reversing switch means in said second conductive state coupling said motor to said voltage source such that said drive shaft means rotates in a second direction;
control means for generating said control signals such that said reversing switch means is switched to said first conductive state when said drive shaft means is at a first angular position and is switched to said second conductive state when said drive shaft means is at a selected one of two second angular positions and; said control means comprising:
operating switch means having a plurality of operating switch positions for determining a corresponding plurality of modes of operation of said apparatus, means for selecting one of a plurality of modes of operations of said apparatus;
first position means for generating a first indicating signal when said drive shaft is at a first anglar position;
second position means for generating a second indicating signal when said drive shaft is at a first one of said two second angular positions;
third position means for generating a third indicating signal when said drive shaft is at a second one of said two second angular positions;
first store means for storing a first signal indicating that said selecting means has selected a first one of said plurality of modes of operations and for coupling said voltage source to said switch means when said first signal is stored;
a reversing store means for storing a first control signal each time said first position means generates said first indicating signal, and for storing a second control signal when said second position means generates said second indicating signal and said selecting means is selecting said first mode of operation or when said third position means generates said third indicating signal and said selecting means is selecting a second one of said plurality of modes of operation, and for supplying said first or second stored control signal to said reversing switch means.

2. Apparatus in accordance with claim 1 wherein said control means comprises:
a pulse generating means for generating pulses when said drive shaft is rotating;
means for counting said pulses and for generating count signals representative of the number of pulses counted;
said first position means comprising means for generating first reference signals corresponding to said first angular position,
first means for comparing said count signals to said first reference signals and for generating said first indicating signal when said count signals and said first reference signals represent the same number;

said second position means comprising means for generating second reference signals representing said first one of said second angular positions, means responsive to said selecting means having selected said being in a first mode of operation for comparing said second reference signal to said count signals and for generating said second indicating signal when said count signals are the same as the compared second reference signals and, said third position means comprising means for generating third reference signals representing said second one of said angular positions, and means responsive to said selecting means having selected said second mode of operation for comprising said third reference signal to said count signals and for generating said third indicating signal when said count signals are the same as the compared third reference signals.

3. Apparatus in accordance with claim 2 further comprising:

a position switch coupled to said motor for setting said counting means to a predetermined count when said motor armature is at a predetermined angular position.

* * * * *